UNITED STATES PATENT OFFICE.

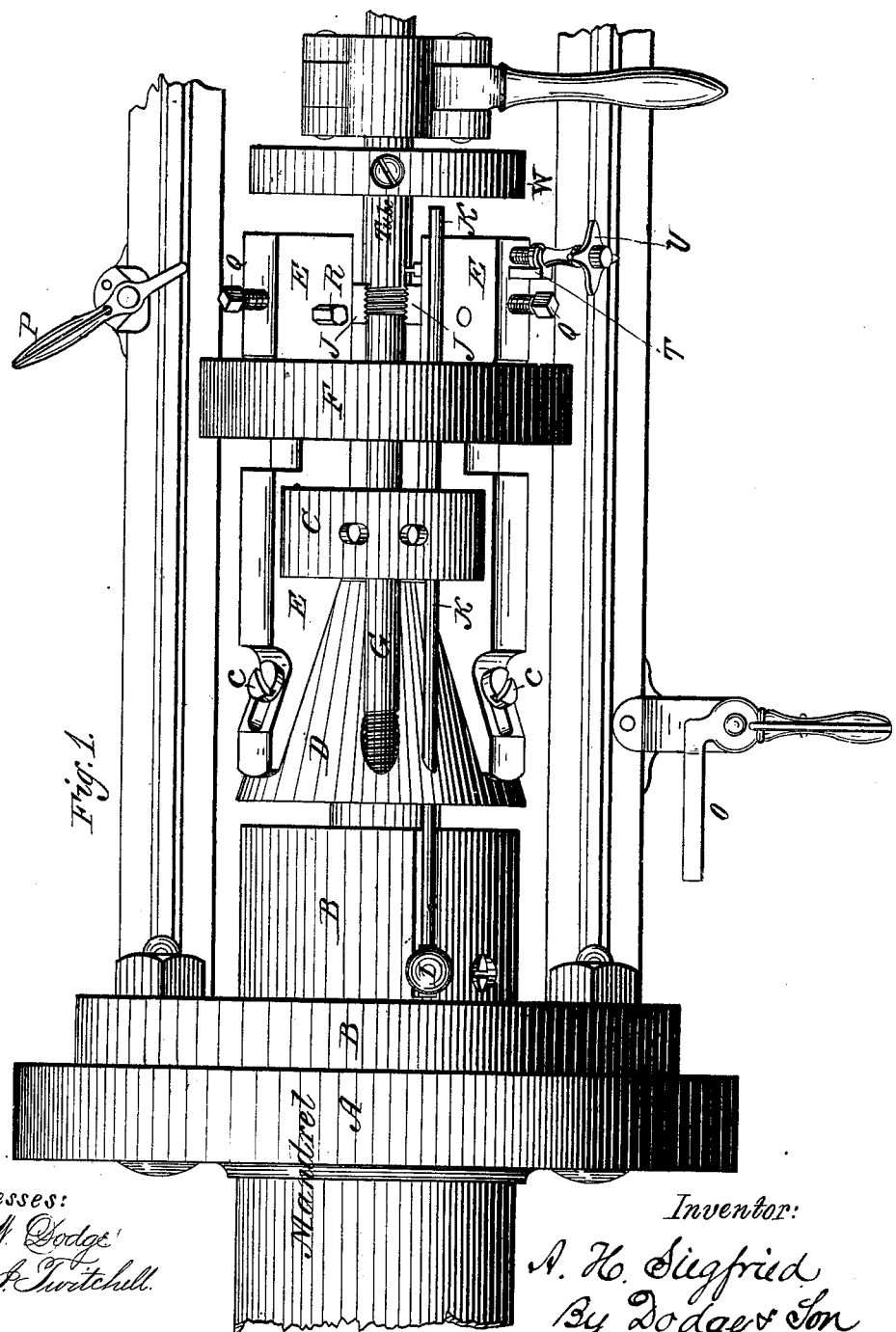

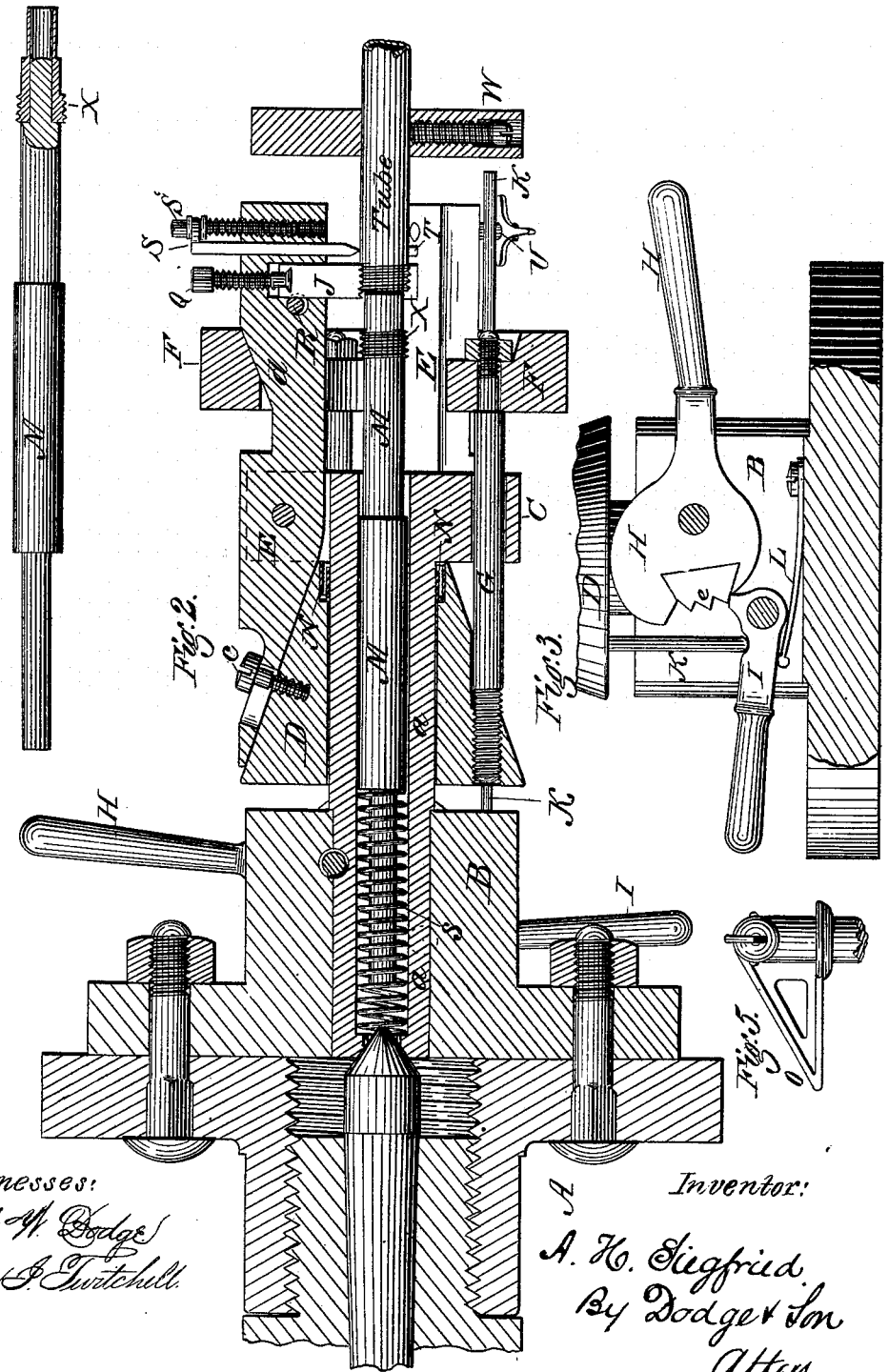

ALEXANDER H. SIEGFRIED, OF SALEM, ASSIGNOR OF ONE-HALF HIS RIGHT TO H. GERHART, OF LEWISBURG, PENNSYLVANIA.

IMPROVEMENT IN MACHINES FOR CUTTING SCREW-THREADS.

Specification forming part of Letters Patent No. 196,710, dated October 30, 1877; application filed March 10, 1877.

*To all whom it may concern:*

Be it known that I, ALEXANDER H. SIEGFRIED, of Salem, in the county of Snyder and State of Pennsylvania, have invented certain Improvements in Screw-Cutting Tools, of which the following is a specification:

The object of my invention is to provide a tool or machine by which threads may be cut with rapidity on tubes, rods, and other objects of different sizes, which will admit of the work being introduced and removed without stopping the motion of the tool, and which will produce work in duplicate in exact accordance with a given gage or standard.

The invention consists in the construction and arrangement, as hereinafter described, of a rotary head provided with pivoted die-carrying arms and devices for actuating, locking, and releasing the same, and in a cutting-off tool and devices for operating the same.

Figure 1 represents a top-plan view of my tool attached to the head-stock of a lathe, with the attendant devices in position to operate therewith, and a tube in position to be threaded, with the dies closed thereon; Fig. 2, a longitudinal central section of the same; Fig. 3, a longitudinal section through the rear end or shank of the tool, showing the levers by which the dies are closed and locked; Fig. 4, a view of the central spindle detached, and Fig. 5 a side view of the inclined dog or arm by means of which the closing of the dies is effected while the tool is in motion.

A represents a rotating face-plate or mandrel, by which my tool is supported and carried, and which may be either the face-plate of a lathe, bolt-cutter, milling-machine, or other suitable machine. B represents a solid metal block, forming the body or shank of my tool; and C, an annular head or plate, connected rigidly to the shank B by means of a central tubular neck, a, as shown in Fig. 2. D represents a metal cone mounted loosely on the neck a, and urged backward toward the shank B by means of a spring, N, as shown in Fig. 2. E represents three longitudinal arms, pivoted in recesses in the head C, and having their rear ends arranged to bear on the cone D, and their forward ends provided with the dies or screw-cutting tools J, as shown.

The ends of the arms which bear on the cone are flattened and slotted longitudinally, and have screws c passed through their slots into the cone, as shown, for the purpose of holding them in contact with the cone and drawing them inward as the cone is pushed backward by the spring.

F represents a stout ring, with a beveled or flaring inside face, surrounding the forward ends of the die-carrying arms E, and bearing on inclined seats d, formed thereon, as shown. This ring is connected with the sliding cone by rods G, as shown, so that the two move forward and backward together, the advance of the cone spreading the rear ends of the arms apart at the same time that the ring draws their forward ends together.

The advance of the cone and ring is effected by means of an eccentric or cam lever, H, pivoted in the body or shank B, and bearing against the base of the cone, as shown in Figs. 2 and 3.

In order to lock the cam-lever so as to hold the cone forward against the pressure of the spring N, and thereby hold the dies shut, the cam-lever is provided with one or more notches, e, and a locking-lever, I, arranged to engage therein, as shown in Fig. 3, a spring, L, being arranged as shown, to cause the automatic engagement of the locking-lever when the other lever is thrown back.

The backward movement of the cam-lever H advances the ring and cone, and causes them to operate the arms E in such manner as to close the dies or cutters inward upon a tube, rod, or other object which may be inserted between them, and then the lever I, falling into place, locks the parts in their operative positions. After the completion of the thread by the dies, the lever I is thrown back and the cam-lever H thereby released, whereupon the spring N moves the cone and ring backward and opens the dies so as to release the work.

In order to guide and center the objects to be threaded accurately between the dies, I mount in the tubular neck a a central spindle, M; and in order that this spindle may serve to force the threaded articles out of the tool when the dies are opened, the spindle is arranged to slide endwise, and a spiral spring, s, placed behind it to push it outward. Another advantage in using the sliding spindle and spring is, that the spindle, projecting beyond the open dies, admits of the object to be threaded being centered on the spindle, so that it will be guided thereby accurately between the dies, so that there will be no danger of its catching or binding eccentrically, and so that the three dies are compelled to cut equally.

I am aware that a sliding central spindle has been employed in center-punches, and in chucks for griping and holding pipe-thimbles, and I lay no claim, therefore, to a sliding central spindle, broadly; but I am not aware that any one has hitherto so constructed and organized a screw-cutting die with a central sliding spindle therein that the tube or rod to be threaded could be sustained and guided by the spindle while being advanced and threaded between the rotating cutters.

In order that the dies may be automatically opened after having cut a thread of a given length, a longitudinal rod, K, is mounted in the tool, as shown, with one end bearing against the locking-lever I and the other projecting forward of the die-carrying arms.

On each article to be threaded I secure, at a distance from the end proportionate to the length of the thread to be cut, a collar or plate, W, so that when the thread attains the proper length the collar abuts against the rod K, and causes it to disengage the locking-lever I, and permit the opening of the dies.

The collar or plate may be made of any suitable size and form, and provided with a thumb-screw, or any other fastening device which will admit of its being readily applied and removed.

It will be observed that by the use of the rod in the tool, and the collar on the article to be threaded, the dies are opened automatically, and the work released without stopping the rotation of the tool.

In order that the dies may be closed as well as opened while the tool is in motion, to the end that the tool may rotate continuously, either to permit the insertion or removal of the work, I pivot to a fixed standard at one side of the tool an inclined arm or dog, O, as in Figs. 1 and 5, which may be set in the path or orbit of the arm H, so as to force the same to one side and close the dies. It is obvious, when the dog is turned out of the path of the arm, the dies may remain open or closed.

Instead of the rod K and collar W, a second dog, similar to O, may actuate the unlocking-lever I.

The dies or threading-tools J are arranged to slide forward and backward through the arms E, and are connected with set-screws Q, by means of which they may be adjusted to thread objects of different diameters. In order to lock the dies securely, each arm E is provided with a transverse pin, R, having an eccentric waist to bear against the edge of the die, and a protruding end to receive a tool for turning it tightly against the die after the latter has been adjusted.

When the tool is to be adjusted for cutting a thread of a particular size, a gage or standard, X, precisely like those to be produced is placed on the spindle M, dies of the proper kind inserted in the arms E, and then the arms brought to their operative positions, and the dies adjusted by the screws to fit the gage, after which the tool must, of course, cut exact duplicates of the gage. The gage may be permitted to remain on the spindle, and made to sustain and center the work, as shown, or it may be removed after the dies have been adjusted.

For the purpose of removing the scale from the surface of the articles to be threaded, and of reducing them in size when required, I mount in one of the arms E, in advance of its die, a cutting-tool, S, and a screw, S', by which it may be adjusted inward and outward.

It will be observed that the screw S' has its head provided with a circumferential groove, and that the cutting-tool S is provided with a flange or rib fitting therein, so that the turning of the screw in one direction or the other advances or retracts the tool. This manner of connecting the screw and the tool, which are guided by the arm, in which they are seated so that they cannot separate, is at once simple, cheap, and secure.

For the purpose of severing or cutting off the threaded end of rods, &c., when required, I mount in one of the arms E a cutting-off tool, T, and a screw, U, for feeding the same inward and outward. The head of the screw is made with projecting studs or arms, and at one side of the tool I mount a stationary pivoted arm, P, which may be turned into the path in which the screw is carried by the rotation of the tool, so as to act against the projecting arms of the screw and turn the same. By shifting the arm so as to meet one side of the screw or the other, the screw may be turned to the right or the left, and the tool T thereby fed inward or outward, as required.

By the above arrangement it will be seen that the cutting-off tool may be gradually fed inward at the same time that it is carried around the rod, tube, or other object, and that, after the severance of the object is effected, by a simple shifting of the arm P, the tool is fed outward again without changing the direction in which the main tool revolves.

When the machine is to form the threads on the work at one cut, the lever H will contain but one notch for the locking-lever; but when two or more cuts are to be made, of different depths, as is sometimes necessary in hard metal, the lever H will have a corresponding number of notches into which the locking-lever will be engaged in succession as the different cuts are made.

In the event of the parts wearing so as to allow the arms E to play or chatter, a slight turning of the rods G will force the cone and the ring F apart, and cause them to take up the lost motion, the cone forcing the arms outward and the ring drawing them inward in such manner that they are held with great firmness and solidity.

It is obvious that by the substitution of suitable dies the machine may be adapted to cut left as well as right hand threads, the motion of the tool being, of course, reversed accordingly.

Having thus described my invention, what I claim is—

1. In a screw-cutting tool, the combination of the pivoted die-carrying arms E with the sliding cone D and ring F, connected by the rods G, substantially as shown.

2. In combination with the pivoted die-carrying arms E, cone D, and spring N, the levers H and I, constructed and arranged to operate as shown.

3. In combination with the rotary screw-cutting tool provided with the die-closing arm, the adjustable inclined arm or dog O, for closing the dies while the tool is in motion.

4. In a rotary screw-cutting tool, the combination of a lever, I, for holding the dies in a closed position, and a longitudinal rod, K, arranged as shown, and for the purpose described, to admit of the dies being released and opened while the tool is in motion.

5. A screw-cutting die constructed substantially as shown, provided with the sliding central spindle M, urged outward by a spring, as shown, whereby the object to be threaded may be centered and supported while being advanced between the rotating cutters.

6. In combination with the pivoted die-carrying arms E, provided with the inclines $d$, the sliding cone D, and the ring F, connected by the screw-rods G, as shown, so that they may be adjusted to compensate for wear.

7. The threading-dies J, seated in mortises in the arms E, in combination with the adjusting-screws Q and the eccentrics R, as shown.

8. In combination with the rotary threading-tool, the radially-movable cutter T, the adjusting-screw U, provided with the studs or arms, and the pivoted arm P, capable of adjustment in such manner as to cause the advance or retreat of the cutter, as required.

9. In combination with a screw-cutting tool provided with the adjustable threading-dies H, a central spindle provided with a gage-thread, X, by which to adjust and center the dies, as shown and described.

ALEXANDER H. SIEGFRIED.

Witnesses:
PHILIP T. DODGE,
DONN J. TWITCHELL.